US009678676B2

(12) United States Patent
Nguyen et al.

(10) Patent No.: US 9,678,676 B2
(45) Date of Patent: Jun. 13, 2017

(54) METHOD FOR STORAGE DEVICES TO ACHIEVE LOW WRITE AMPLIFICATION WITH LOW OVER PROVISION

(75) Inventors: Lau Nguyen, Sunnyvale, CA (US); Perry Neos, Los Altos, CA (US); Luan Ton-That, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 759 days.

(21) Appl. No.: 13/461,899

(22) Filed: May 2, 2012

(65) Prior Publication Data

US 2012/0303873 A1 Nov. 29, 2012

Related U.S. Application Data

(60) Provisional application No. 61/489,628, filed on May 24, 2011.

(51) Int. Cl.
*G06F 12/02* (2006.01)
*G06F 3/06* (2006.01)

(52) U.S. Cl.
CPC .......... *G06F 3/0616* (2013.01); *G06F 3/0652* (2013.01); *G06F 3/0679* (2013.01); *G06F 12/0246* (2013.01); *G06F 2212/7209* (2013.01)

(58) Field of Classification Search
None
See application file for complete search history.

(56) References Cited

U.S. PATENT DOCUMENTS

| | | | | |
|---|---|---|---|---|
| 8,438,334 B2* | 5/2013 | Bell et al. | | 711/117 |
| 8,521,972 B1* | 8/2013 | Boyle et al. | | 711/159 |
| 8,621,328 B2* | 12/2013 | Franceschini | | G11C 16/349 |
| | | | | 711/103 |
| 8,677,054 B1* | 3/2014 | Meir | | G06F 12/0246 |
| | | | | 707/817 |
| 2010/0185830 A1 | 7/2010 | Asnaashari et al. | | |
| 2011/0040930 A1* | 2/2011 | Shin | | G06F 12/0246 |
| | | | | 711/103 |
| 2011/0066788 A1 | 3/2011 | Eleftheriou et al. | | |
| 2011/0185124 A1* | 7/2011 | Koseki | | 711/114 |

FOREIGN PATENT DOCUMENTS

| | | |
|---|---|---|
| CN | 101719099 A | 6/2010 |
| JP | 2007172447 A | 7/2007 |
| WO | WO-2007/073536 A2 | 6/2007 |

OTHER PUBLICATIONS

First Office Action and Search Report corresponding to Chinese Patent Application No. 201280024279.6 dated Sep. 17, 2015, 10 pages.

(Continued)

*Primary Examiner* — Charles Rones
*Assistant Examiner* — Ryan Dare

(57) ABSTRACT

A solid state drive (SSD) includes an SSD control module configured to determine frequencies corresponding to how often data stored in respective logical addresses associated with the SSD is updated and form groups of the logical addresses according to the frequencies, and a memory control module configured to rewrite the data to physical addresses in blocks of an SSD storage region based on the groups.

14 Claims, 5 Drawing Sheets

(56) References Cited

OTHER PUBLICATIONS

Chang, Li-Pin, and Tei-Wei Kuo. Proceedings of the Eighth IEEE Real-Time and Embedded Technology and Applications Symposium (RTAS '02). An Adaptive Striping Architectue for Flash Memory Storage Systems of Embedded Systems. 0-7695-1739-0/02. IEEE, Sep. 2002, 10 pages.

Notification of Transmittal of the International Search Report and the Written Opinion of the International Searching Authority, or the Declaration dated Jul. 4, 2012 in reference to PCT/US2012/036070 (9 pgs).

Chang, Lin-Pin, and Tei-Wei Kuo. "An Adaptive Striping Architecture for Flash Memory Storage Systems of Embedded Systems." Real-time and Embedded Technology and Applications Symposium. Piscataway, NJ, USA, IEEE. Sep. 24, 2002. (10 pages).

Organized Translation of Notice of Reasons for Rejection corresponding to Japanese Patent Application No. 2014-512851 dated May 31, 2016, 2 pages.

\* cited by examiner

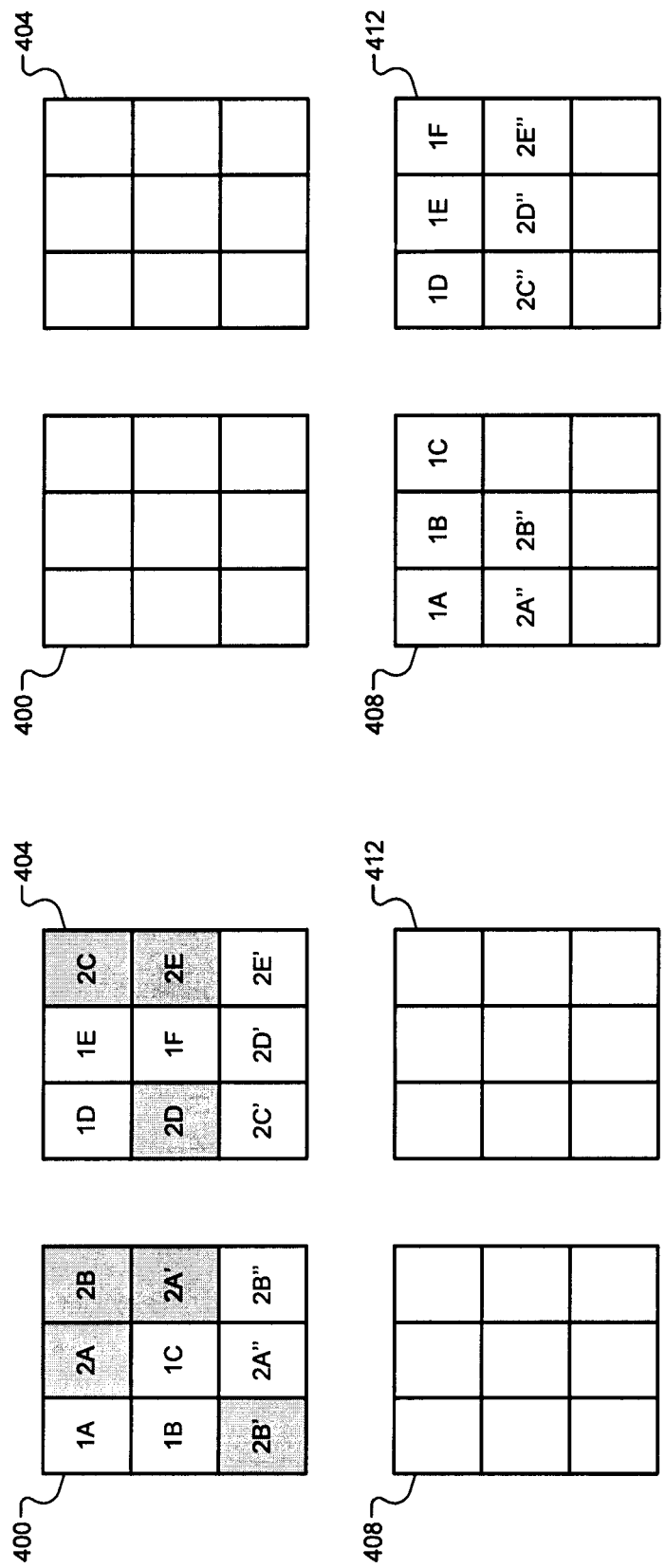

METHOD FOR STORAGE DEVICES TO ACHIEVE LOW WRITE AMPLIFICATION WITH LOW OVER PROVISION

CROSS-REFERENCE TO RELATED APPLICATIONS

This application claims the benefit of U.S. Provisional Application No. 61/489,628, filed on May 24, 2011. The disclosure of the above application is incorporated herein by reference in its entirety.

FIELD

The present disclosure relates to minimizing write amplification in storage devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Storage devices such as solid state drives (SSDs) may include one or more flash memory devices. For example only, the flash memory devices may include NAND-based flash memory. Typically, storage regions of flash memory are arranged in blocks, which are each divided into addressable pages. Data is written to and stored in the flash memory on a page-by-page basis within the blocks. Conversely, to rewrite or erase data, the entire corresponding block is erased.

When data stored in a particular page is updated, all of the valid data in the block needs to be erased and rewritten (i.e., any pages storing data that has not been changed or updated). Invalid data (i.e., pages storing data that has been changed or updated and therefore already rewritten elsewhere) may simply be erased. For example, a host that writes to the storage device writes data to a logical address such as a logical block address (LBA). Conversely, the storage device maps and writes the data to a physical address corresponding to the logical address. When the storage device needs to update data in a particular physical address (i.e., in one or more pages in a block), the entire block is erased and written to the same block or a different block, but the corresponding logical address remains the same. Accordingly, a system that includes the storage device performs a greater number of write operations than the host.

In other words, a number of physical writes is greater than a number of logical writes. A ratio of the number of physical writes to the number of logical writes may be referred to as write amplification (WA). A relatively high write amplification (e.g., a WA of 5 or greater) results in more wear on the storage device, and therefore a shorter lifetime of the storage device. Conversely, a relatively low write amplification (e.g., a WA approaching 1) improves performance and the lifetime of the storage device.

The storage device may implement wear-leveling and overprovisioning to minimize the write amplification. For example, overprovisioning refers to providing a greater number of physical locations in the storage device than a corresponding number of logical addresses associated with the host (i.e., a logical capacity of the host). In other words, the storage device includes more physical locations than the host includes logical locations. The surplus of physical locations provides excess physical capacity to the storage device. A ratio of the excess physical capacity of the storage device to the overall physical capacity of the storage device (and the logical capacity of the host) is referred to as an overprovision ratio (OPR). For example, if the storage device has an overall physical capacity of 100 gigabytes (GB) and the logical capacity of the host is 75 GB, then the OPR is 25:100, or 25%.

The OPR of the storage device may be directly related to the write amplification of the storage device. For example, when data stored in a single page of the flash memory data is updated, the data can be rewritten to an empty page in an extra physical location in a different block of the flash memory instead of erasing an entire block that is currently storing the data. The original page storing the data may simply be marked as stale or invalid, avoiding a complete rewrite of the entire block. This can be repeated for additional writes until the entire block is full of invalid data or the ratio of invalid data to valid data is greater than a threshold, and/or according to cleanup and merge operations (e.g., garbage collection). Accordingly, as the OPR of the storage device increases, the write amplification of the storage device decreases because a number of additional rewrites can be avoided. For example only, an OPR of 10% may correspond to a write amplification of approximately 5, an OPR of 25% may correspond to a write amplification of approximately 2, and an OPR of 50% may correspond to a write amplification approaching 1.

SUMMARY

A solid state drive (SSD) includes an SSD control module configured to determine frequencies corresponding to how often data stored in respective logical addresses associated with the SSD is updated and form groups of the logical addresses according to the frequencies, and a memory control module configured to rewrite the data to physical addresses in blocks of an SSD storage region based on the groups.

A method of operating a solid state drive (SSD includes determining frequencies corresponding to how often data stored in respective logical addresses associated with the SSD is updated, forming groups of the logical addresses according to the frequencies, and rewriting the data to physical addresses in blocks of an SSD storage region based on the groups.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIGS. 4A and 4B illustrate flash memory blocks storing data without rearranging the data according to a zone list;

DESCRIPTION

A system according to the present disclosure reduces write amplification (WA) for a storage device (e.g., a solid state drive, or SSD, including NAND-based flash memory) while also reducing overprovisioning. For example only, the storage device may provide one terabyte (TB) of logical capacity to a host while including only 16 gigabytes (GB) of excess physical capacity, which corresponds to an overprovisioning ratio (OPR), while achieving a relatively low write amplification of 1.1.

The system allocates more of the excess physical capacity to logical regions of the storage device that are more dynamic (i.e., that are written to, and rewritten, frequently). Conversely, the system allocates less of the excess physical capacity to logical regions of the storage device that are more static (i.e., are not rewritten frequently). Consequently, the OPR may be relatively high for the more dynamic logical regions, and is relatively low for the more static logical regions, which may not require significant overprovisioning and therefore do not significantly contribute to the write amplification. The system may adjust the OPR for each logical region dynamically based usage patterns of the host. For example, the usage patterns may vary based on host operating systems, host applications, and other factors associated with usage of particular logical regions.

Although the present disclosure describes the system with respect to SSDs, the principles of the system may also be implemented with other storage devices, such as a hard disk drive (HDD), to improve write performance, reduce cleanup/merge overhead, and lower costs associated with overprovisioning.

Figure 1:
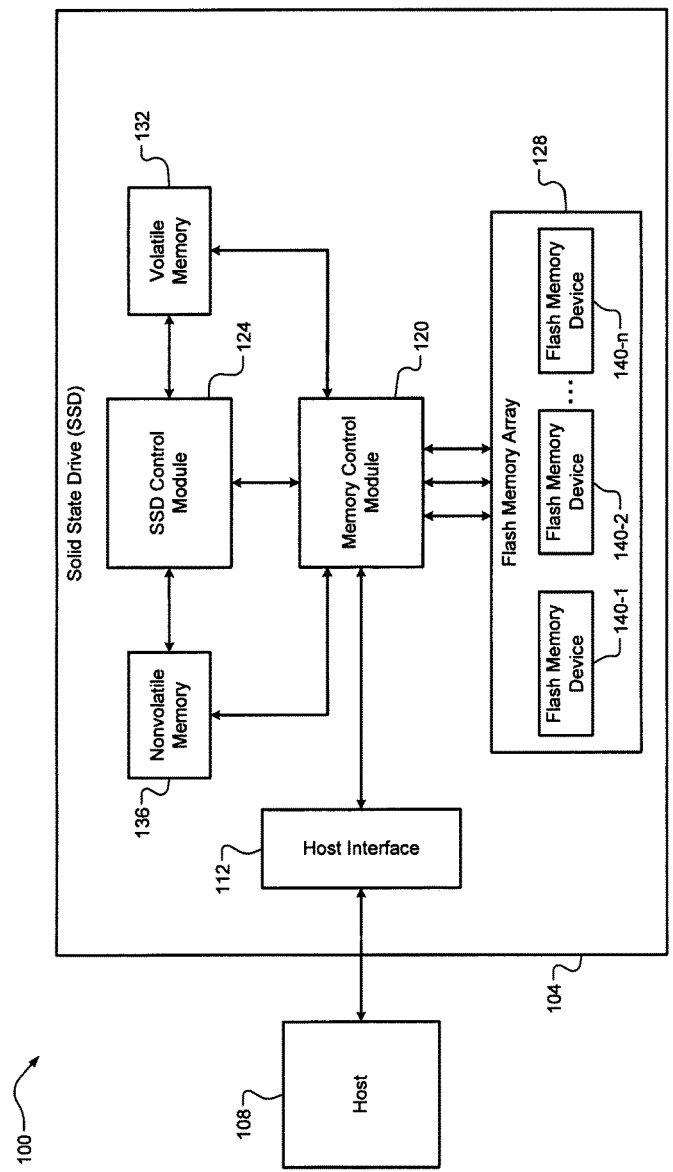
FIG. 1 is functional block diagram of a storage drive system according to the principles of the present disclosure.

Referring now to FIG. 1, a storage drive system 100 includes a solid state drive (SSD) 104 that communicates with a host 108 via a host interface 112. The host interface 112 receives data to be stored on the SSD 104 from the host 108 (e.g. via a write operation), and transmits data stored on the SSD 104 to the host 108 (e.g., via a read operation).

The SSD 104 includes a memory control module 120, an SSD control module 124, and an SSD storage region such as a flash memory array 128. During a write operation, the memory control module 120 writes data from the host 108 to the flash memory array 128. For example, the write operation may write data to a logical address such as a logical block address (LBA). The memory control module 120 maps each LBA to a physical address in the flash memory array, and writes the data to the corresponding physical address. For example only, volatile memory 132, nonvolatile memory 136, or other memory (e.g., memory within the memory control module 120) may store mapping information that associates each LBA with a physical address. Conversely, during a read operation, the host 108 requests data from an LBA and the memory control module 120 reads the data from the corresponding physical address in the flash memory array 128. One or more of the components of the SSD 104 such as the host interface 112, the memory control module 120, the SSD control module 124, the volatile memory 132, and the nonvolatile memory 136 may be located on a system on a chip (SOC).

The flash memory array 128 may include one or more flash memory devices 140-1, 140-2, . . . , and 140-n, referred to collectively as flash memory devices 140. Each flash memory device 140 stores data in a plurality of blocks, and each of the blocks includes a plurality of addressable pages. Each of the addressable pages is a physical memory location that corresponds to a physical address, which in turn is associated with an LBA. Accordingly, each LBA written to or read by the host 108 corresponds to a physical location in one of the flash memory devices that is accessed according to one of the addressable pages. For example only, the flash memory devices 140 may implement NAND-based flash memory cells.

The SSD control module 124 implements overprovisioning allocation according to the principles of the present disclosure. The SSD control module 124 determines which LBAs are relatively static and which LBAs are relatively dynamic. In other words, the relatively static LBAs are updated (e.g., written and rewritten) less frequently, and the relatively dynamic LBAs are updated more frequently. For example only, LBAs that are relatively static may correspond to data such as program or application files, and photo, music, or other multimedia files. Conversely, LBAs that are relatively dynamic may correspond to data that is updated frequently by a user.

The SSD control module 124 may maintain a list of all of the LBAs arranged according to update frequency. The list may be stored in the volatile memory 132 during normal operation and stored periodically in the nonvolatile memory 136 to avoid loss of data. The list may arrange the LBAs into different zones, where each of the zones corresponds to a different update frequency. Each zone includes a plurality of LBAs. For example only, the list may include 10 zones, with each zone including 10% of the LBAs. Or, the list may include 100 zones, with each zone including 1% of the LBAs. The SSD control module 124 rearranges the LBAs based on the corresponding zones. For example only, the SSD control module 124 may include one or more processors executing firmware stored on the nonvolatile memory 136.

Figure 2:
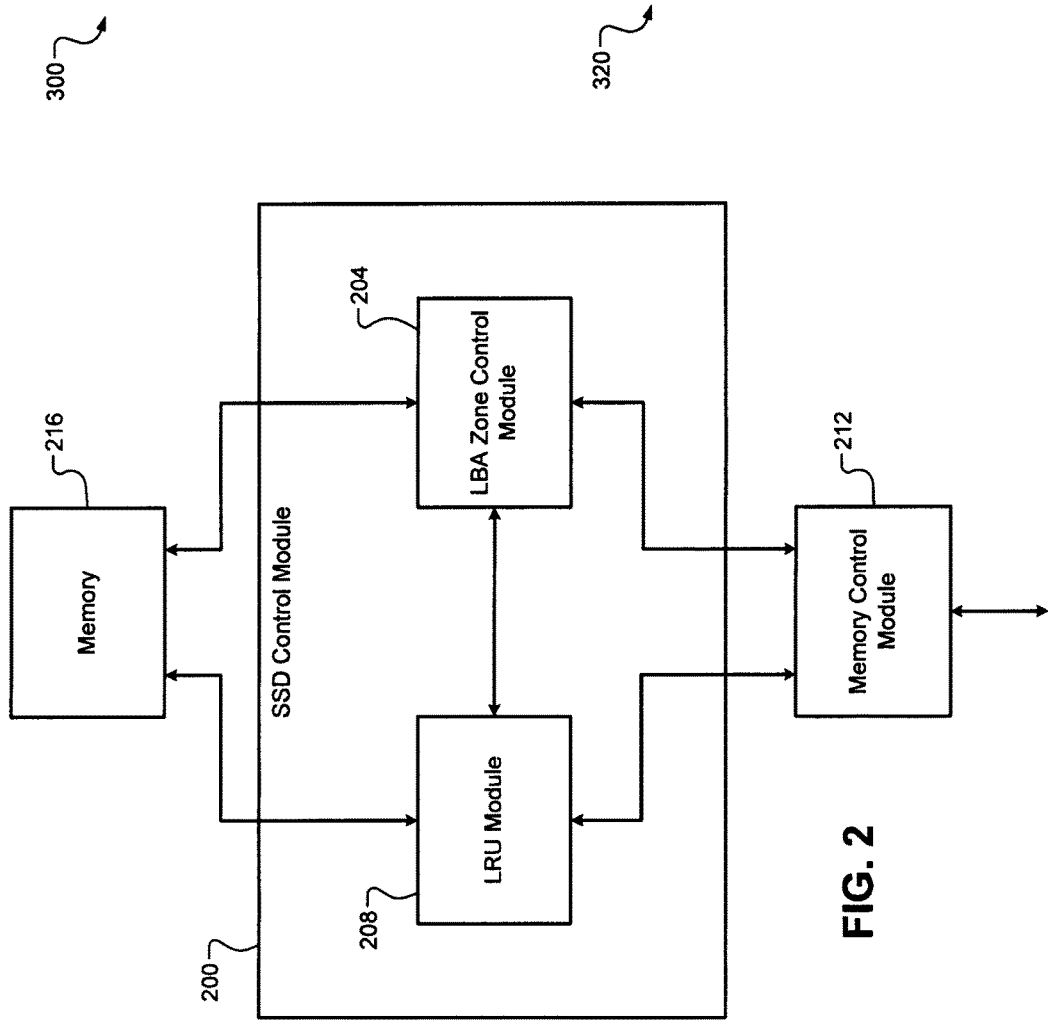
FIG. 2 is a functional block diagram of a solid state drive control module according to the principles of the present disclosure.

Referring now to FIG. 2, an example of an SSD control module 200 includes an LBA zone control module 204 and a least recently used (LRU) module 208. The LBA zone control module 204 determines which LBAs are in each zone based on how frequently each of the LBAs is updated by the host 108. When the SSD control module 200 remaps the LBAs to corresponding physical addresses in the flash memory array 128, the SSD control module 200 arranges the LBAs within the blocks of the flash memory array 128 according to the zones.

For example, the SSD control module 200 may periodically instruct memory control module 212 to rearrange any valid data stored in the flash memory array 128 based on the mapping of the LBAs to the physical zones during garbage collection or other maintenance procedures. Rearranging the data may include rewriting portions (i.e., portions corresponding to valid data) of one or more first blocks of data to a second block and erasing the first blocks of data. Accordingly, the valid data stored in a particular physical location in the flash memory array 128 retains the same LBA, but the LBA may be mapped to a new physical location.

The LBA zone control module 204 determines which LBAs are assigned to which zone based on, for example, information received from the LRU module 208. The LRU module 208 may implement an LRU engine or algorithm to arrange the LBAs in an ordered LRU list based on how recently each LBA was last used. For example, LBAs at a top of the LRU list may correspond to the least recently written to LBAs, and LBAs at a bottom of the LRU list may correspond to the most recently written to LBAs. For example only, when an LBA is written to, that LBA may drop to the bottom of the LRU list. In this manner, most recently written to LBAs will tend toward the bottom of the LRU list, and correspond to relatively dynamic LBAs. Conversely, the least recently written to LBAs will tend toward the top of the LRU list, and correspond to relatively static LBAs. The LRU module 208 may store the LRU list in memory 216 and/or communicate the LRU list to the LBA zone control module 204. For example only, the memory 216 may correspond to the volatile memory 132 and/or the nonvolatile memory 136 as shown in FIG. 1.

The LBA zone control module 204 may maintain a zone list based on the LRU list received from the LRU module 208. For example, the zone list may include 10 zones, each including 10% of the LBAs. For example only, the LBAs corresponding to the first 10% of the least recently written to LBAs (i.e., the 10% of the LBAs at the top of the LRU list) may be assigned to zone 1. The next 10% of the least recently written to LBAs may be assigned to zone 2. Conversely, the last 10% (i.e., the 10% of the LBAs at the bottom of the LRU list) may be assigned to zone 10.

Figure 3A:
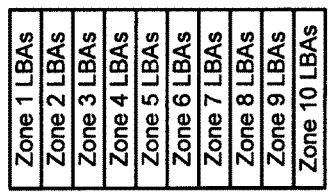
FIGS. 3A and 3B illustrate an example of logical address zone lists according to the principles of the present disclosure.
Figure 3B:
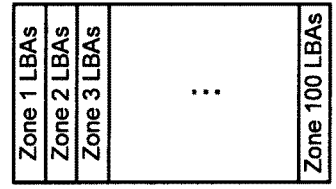

An example of a zone list 300 including 10 zones is shown in FIG. 3A. An example of a zone list 320 including 100 zones is shown in FIG. 3B. It can be appreciated that any number of zones may be used. For example, the zone list may include only two zones, with one zone representing a static zone and another zone representing a dynamic zone. Further, the LBAs can be assigned to the zones in any proportion. In other words, each zone does not necessarily have to include the same number of LBAs. For example, if a zone list includes only two zones, a first zone representing a static zone may include 75% of the LBAs. Conversely, a second zone representing a dynamic zone may include 25% of the LBAs.

Referring now to FIGS. 4A and 4B, flash memory blocks 400, 404, 408, and 412 storing data without rearranging the data according to a zone list are shown. For simplicity, only two zones (zone 1 and zone 2) are used, but any number of zones may be used. Similarly, while only four blocks each having nine addressable pages are shown, any number of blocks having any number of addressable pages may be used.

As shown in FIG. 4A, the block 400 may store zone 1 data including 1A, 1B, and 1C, and zone 2 data initially including 2A and 2B. The zone 2 data may be subsequently updated and therefore rewritten as 2A' and 2B'. Accordingly, the pages corresponding to 2A and 2B store invalid data. If the zone 2 data is updated and rewritten again as 2A" and 2B", the pages corresponding to 2A' and 2B' also store invalid data. Accordingly, after several rewrites of the zone 2 data, the block 400 may be full, but includes four pages of invalid data.

Similarly, the block 404 may store zone 1 data including 1D, 1E, and 1F, and zone 2 data initially including 2C, 2D, and 2E. The zone 2 data may be subsequently updated and rewritten as 2C', 2D', and 2E', which correspond to the same logical addresses as 2C, 2D, and 2E, respectively. Accordingly, the pages corresponding to 2C, 2D, and 2E store invalid data. Accordingly, after one or more rewrites of the zone 2 data, the block 404 may be full, but includes three pages of invalid data. The blocks 408 and 412 are empty, and may be used as overprovisioning for the blocks 400 and 404. In other words, if additional rewrites are performed on any of the zone 2 data in the blocks 400 and 404 prior to a cleanup/merge operation, the zone 2 data may be rewritten to the blocks 408 and 412 while still storing the valid zone 1 data and the invalid zone 2 data in the blocks 400 and 404.

Referring now to FIG. 4B, the valid data stored in the blocks 400 and 404 may be rewritten to the blocks 408 and 412, and the blocks 400 and 404 are completely erased. Accordingly, even the zone 1 data and the valid zone 2 data are erased and rewritten. However, subsequent updates to the zone 2 data will fill the blocks 408 and 412 relatively quickly with new zone 2 data and invalid zone 2 data. As such, additional overprovisioning will be needed to accommodate the rewrites, and multiple blocks will likely be needed to accommodate the overprovisioning. Further, despite the zone 1 data being static and valid, each page of the zone 1 data is erased and rewritten each time the updated zone 2 data fills one of the blocks.

Although as shown the data from two blocks is rewritten to two different blocks, the data from two or more blocks can be combined in a single block or otherwise rearranged for optimum storage.

Figures 5A, 5B:
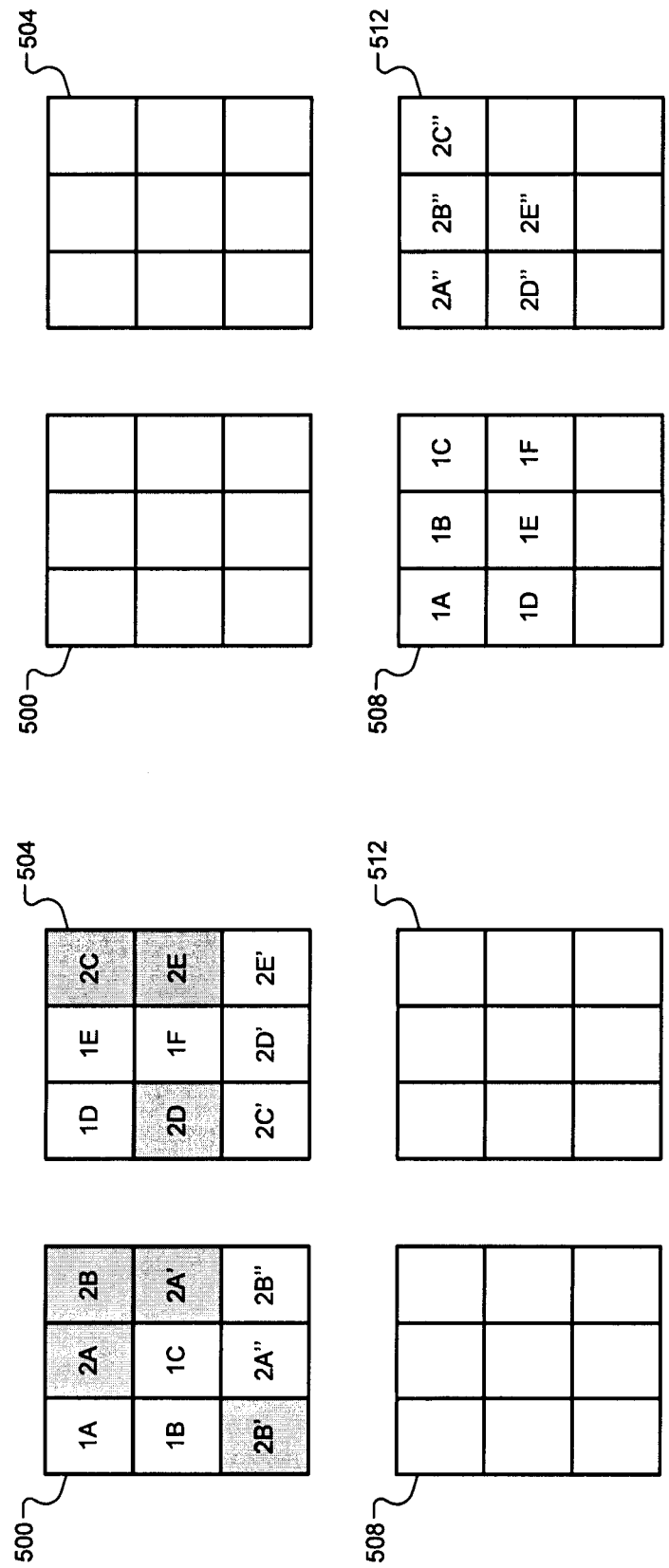
FIGS. 5A and 5B illustrate flash memory blocks storing data according to a zone list.

Referring now to FIGS. 5A and 5B, flash memory blocks 500, 504, 508, and 512 storing data according to a zone list are shown. As shown in FIG. 5A, the block 500 may store zone 1 data including 1A, 1B, and 1C, and zone 2 data initially including 2A and 2B. The zone 2 data may be subsequently updated and therefore rewritten as 2A' and 2B'. Accordingly, the pages corresponding to 2A and 2B store invalid data. If the zone 2 data is updated and rewritten again as 2A" and 2B", the pages corresponding to 2A' and 2B' also store invalid data. Accordingly, after several rewrites of the zone 2 data, the block 500 may be full, but includes four pages of invalid data.

Similarly, the block 504 may store zone 1 data including 1D, 1E, and 1F, and zone 2 data initially including 2C, 2D, and 2E. The zone 2 data may be subsequently updated and rewritten as 2C', 2D', and 2E'. Accordingly, the pages corresponding to 2C, 2D, and 2E store invalid data. Accordingly, after one or more rewrites of the zone 2 data, the block 504 may be full, but includes three pages of invalid data. The blocks 508 and 512 are empty, and may be used as overprovisioning for the blocks 500 and 504. In other words, if additional rewrites are performed on any of the zone 2 data in the blocks 500 and 504 prior to a cleanup/merge operation, the zone 2 data may be rewritten to the blocks 508 and 512 while still storing the valid zone 1 data and the invalid zone 2 data in the blocks 500 and 504.

Referring now to FIG. 5B, the valid data stored in the blocks 500 and 504 may be rewritten to the blocks 508 and 512, and the blocks 500 and 504 are completely erased. However, in contrast to the example shown in FIGS. 4A and 4B, the data is rearranged according to the zone list. For example, the zone 1 data is stored together in the block 508 based on the LRU list and zone list as described in FIGS. 2 and 3. Conversely, the zone 2 data is stored together in the block 512 based on the LRU list and the zone list.

Accordingly, the static zone 1 data stored in the block 508 may avoid rewrites and overprovisioning for a greater amount of time than a block storing both zone 1 data and zone 2 data. For example, certain types of zone 1 data may never be updated. During subsequent write operations or rewriting of other blocks, additional zone 1 data may be written to the empty pages in the block 508. However, it can be appreciated that overprovisioning for the block 508 is reduced. More specifically, because the data stored in the block 508 is only the static zone 1 data, updates are infrequent. Therefore, the block 508 is significantly less likely to become filled with invalid data and require overprovisioned storage space.

Conversely, the dynamic zone 2 data stored in the block 512 may be updated more frequently. Therefore, the block 512 is more likely to become filled with invalid data and require overprovisioned storage space. However, because the block 508 is unlikely to require overprovisioning, only one of the empty blocks 500 and 504 may be needed to provide overprovisioning for the block 512 and/or additional blocks storing dynamic zone 2 data. Accordingly, less excess capacity may be provided and the OPR can be minimized, and the overprovisioned storage space may be allocated more to LBAs in dynamic zones. For example, the OPR may be less than 5%. For example only, the OPR may be approximately 1.5% and achieve a write amplification of approximately 1.1.

Figure 6:
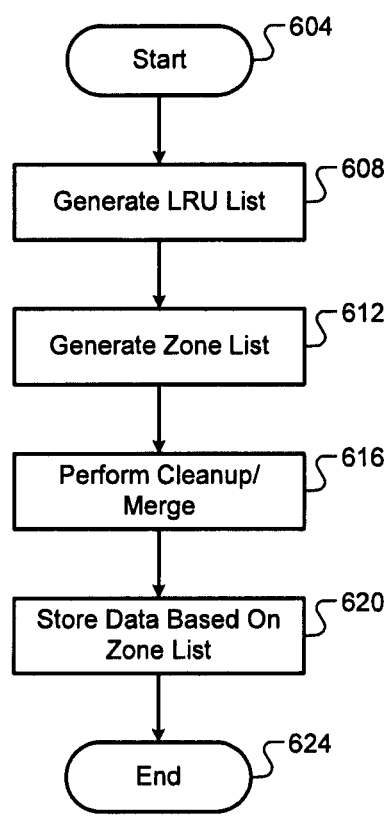
FIG. 6 illustrates a solid state drive control method according to the principles of the present disclosure.

Referring now to FIG. 6, an SSD control method 600 begins at 604. At 608, the method 600 determines how frequently each logical address is used. For example, the method 600 generates and maintains an LRU list for the logical addresses. At 612, the method 600 arranges the logical addresses in different zones based on the LRU list. Each zone corresponds to how frequently the respective logical addresses are updated (i.e., written to). For example, the method 600 generates and maintains a zone list for the logical addresses. At 616, the method 600 performs a cleanup/merge or other maintenance operation on a plurality of blocks of flash memory. At 620, the method 600 rewrites the data stored in the plurality of blocks based on the zone list. For example, the method 600 stores data corresponding to logical addresses in the same zone to the same block. The method 600 ends at 624.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A solid state drive (SSD), comprising:
    an SSD control module configured to determine frequencies corresponding to how often data stored in respective logical addresses associated with the SSD is updated and form groups of the logical addresses according to the frequencies, wherein forming the groups includes
        generating a least recently used (LRU) list of the logical addresses, wherein the LRU list is indicative of how often the data stored in each of the logical addresses is updated,
        arranging, according to respective update frequencies, different ranges of the logical addresses into a plurality of zones, wherein each of the respective update frequencies corresponds to how often the data is updated in a respective one of the different ranges of the logical addresses, such that each of the plurality of zones includes a different range of the logical addresses having a respective update frequency and each of the plurality zones includes at least one of the logical addresses, and
        generating a zone list including the plurality of zones based on the LRU list; and
    a memory control module configured to rewrite the data to physical addresses in blocks of an SSD storage region based on the groups, wherein, to rewrite the data, the memory control module is further configured to, using the zone list,
        rewrite first data in a first logical address associated with a first zone from a first block of the SSD storage region into a second block of the SSD storage region,
        rewrite second data in a second logical address associated with the first zone from a third block of the SSD storage region into the second block of the SSD storage region, and
        rewrite third data in a third logical address associated with a second zone from the first block of the SSD storage region into a fourth block of the SSD storage region.

2. The SSD of claim 1, wherein the SSD control module includes:
    an LRU module configured to generate the LRU list; and
    a zone control module configured to generate the zone list.

3. The SSD of claim 1, wherein the logical addresses include logical block addresses (LBAs).

4. The SSD of claim 1, wherein the SSD storage region includes a flash memory array.

5. The SSD of claim 1, wherein the SSD control module includes a processor configured to execute firmware.

6. The SSD of claim 1, wherein the LRU list and the zone list are stored in at least one of volatile memory and nonvolatile memory.

7. The SSD of claim 1, wherein:
a first number of physical addresses associated with the SSD is greater than a second number of the logical addresses; and
a ratio of a difference between the first number and the second number to the second number is less than 5%.

8. The SSD of claim 7, wherein a write amplification associated with the SSD is approximately 1.1.

9. A method of operating a solid state drive (SSD), the method comprising:
determining frequencies corresponding to how often data stored in respective logical addresses associated with the SSD is updated;
forming groups of the logical addresses according to the frequencies, wherein the forming the groups includes,
generating a least recently used (LRU) list of logical addresses associated with the SSD, wherein the LRU list is indicative of how often the data stored in each of the logical addresses is updated,
arranging, according to respective update frequencies, different ranges of the logical addresses into a plurality of zones, wherein each of the respective update frequencies corresponds to how often the data is updated in a respective one of the different ranges of the logical addresses, such that each of the plurality of zones includes a different range of the logical addresses having a respective update frequency and each of the plurality zones includes at least one of the logical addresses, and
generating a zone list including the plurality of zones based on the LRU list; and
rewriting the data to physical addresses in blocks of an SSD storage region based on the groups, wherein rewriting the data includes, using the zone list,
rewriting first data in a first logical address associated with a first zone from a first block of the SSD storage region into a second block of the SSD storage region,
rewriting second data in a second logical address associated with the first zone from a third block of the SSD storage region into the second block of the SSD storage region, and
rewriting third data in a third logical address associated with a second zone from the first block of the SSD storage region into a fourth block of the SSD storage region.

10. The method of claim 9, wherein the logical addresses include logical block addresses (LBAs).

11. The method of claim 9, wherein the SSD storage region includes a flash memory array.

12. The method of claim 9, wherein the LRU list and the zone list are stored in at least one of volatile memory and nonvolatile memory.

13. The method of claim 9, wherein:
a first number of physical addresses associated with the SSD is greater than a second number of the logical addresses; and
a ratio of a difference between the first number and the second number to the second number is less than 5%.

14. The method of claim 13, wherein a write amplification associated with the SSD is approximately 1.1.

* * * * *